US008282897B2

(12) United States Patent
Marafi

(10) Patent No.: US 8,282,897 B2
(45) Date of Patent: Oct. 9, 2012

(54) PROCESS FOR RECOVERING BOEHMITE AND Y-Al2O3 FROM SPENT HYDROPROCESSING CATALYSTS

(75) Inventor: Meena Marafi, Salwa (KW)

(73) Assignee: Kuwait Institute for Scientific Reaearch, Safat (KW)

( * ) Notice: Subject to any disclaimer, the term of this patent is extended or adjusted under 35 U.S.C. 154(b) by 133 days.

(21) Appl. No.: 12/862,946

(22) Filed: Aug. 25, 2010

(65) Prior Publication Data

US 2012/0051988 A1    Mar. 1, 2012

(51) Int. Cl.
*C01G 39/00* (2006.01)
(52) U.S. Cl. ............ 423/53; 423/68; 423/119; 423/122; 423/127; 423/628
(58) Field of Classification Search .................... 423/53, 423/68, 119, 122, 127, 628
See application file for complete search history.

(56) References Cited

U.S. PATENT DOCUMENTS

| | | | | |
|---|---|---|---|---|
| 3,773,890 A | * | 11/1973 | Fox et al. ......................... | 423/58 |
| 4,382,068 A | * | 5/1983 | Rokukawa ...................... | 423/53 |
| 4,474,735 A | * | 10/1984 | Rastas et al. .................... | 423/53 |
| 4,666,685 A | * | 5/1987 | Wiewiorowski ................ | 423/55 |
| 4,670,229 A | * | 6/1987 | Wiewiorowski et al. ....... | 423/55 |
| 4,721,606 A | * | 1/1988 | Tilley .............................. | 423/54 |
| 4,861,565 A | * | 8/1989 | Sefton et al. .................... | 423/55 |

FOREIGN PATENT DOCUMENTS

| CN | 1544666 | * | 11/2004 |
|---|---|---|---|
| JP | 56-078431 | * | 6/1981 |

* cited by examiner

*Primary Examiner* — Steven Bos
(74) *Attorney, Agent, or Firm* — Lowe Hauptman Ham & Berner, LLP

(57) ABSTRACT

A process for the recovery of high purity boehmite with controlled pore size from spent hydroprocessing catalyst includes the step of treating the spent hydroprocessing catalyst composition in order to get recovery of the aluminas after extracting the valuable metals. The process permits easy and resourceful recovery of high quality boehmite from waste catalyst, which can be further used as hydroprocessing catalyst carrier having a pore structure almost identical or better than that used in heavy oil hydroprocessing catalysts. Such catalyst carrier is required to have high pore volume, macroporosity, high strength and optimum surface area for active metal dispersion. The treating steps include process steps such as decoking, roasting, leaching, dissolving, digestion, precipitation, washing, stripping, and the like. The recovery steps include digestion, hydrothermal treatment, flocculation or precipitation, filtration, drying, calcination and the like. The precipitated and hydrothermally treated resulting solid is well crystallized boehmite and has a surface area, pore volume and pore diameter distribution for reuse in the preparation of active catalysts and catalyst supports.

12 Claims, 4 Drawing Sheets

PROCESS FOR RECOVERING BOEHMITE AND γ-Al2O3 FROM SPENT HYDROPROCESSING CATALYSTS

FIELD OF THE INVENTION

This invention relates to a method for recovering boehmite and $\gamma$-$Al_2O_3$ from spent hydroprocessing catalyst and more particularly to a method for the recovery of valuable monohydrate alumina (boehmite) having high purity and having a significantly large specific surface area, and pore volume that can be effectively used for hydroprocessing catalyst preparation. More specifically, the intention relates to a process for the preparation of boehmite and γ-alumina with high surface area and controlled pore size from spent hydroprocessing catalysts.

BACKGROUND FOR THE INVENTION

Solid catalysts containing metals, metal oxides or sulfides, play a key role in the refining of petroleum to clean fuels. After use, the spent catalysts are discarded as solid waste. In refineries, the spent catalysts discarded from hydroprocessing units form a major part of these solid wastes. Disposal of spent hydroprocessing catalysts requires fulfillment with environmental regulations because of their hazardous nature and toxic chemicals content and they may present significant environmental problems, as landfill disposal is no longer accepted. Several alternative methods such as disposal in landfills, reclamation of metals, regeneration/rejuvenation and reuse, and utilization as raw materials to produce other useful products are available to the refiners to deal with the spent catalyst problem. The various options available for handling the spent catalyst problem have been reviewed by Marafi and Stanislaus in some recent papers (Journal of Hazardous Materials B, 101 (2003) 123-132; Resources, Conservation and Recycling 52 (2008) 859-873; Resources, Conservation and Recycling 53 (2008) 1-26).

As pointed out in the aforementioned papers, utilization of spent hydroprocessing catalysts in the production of valuable products is an attractive option from environmental and economical points of view. For example, spent fluid catalytic cracking catalysts have been successfully used in cement production. The spent hydroprocessing catalysts containing Mo, Co or Ni and vanadium have been used for recovering valuable metals and alumina. Several methods such as chlorination, acid leaching, alkali leaching, bioleaching, roasting with soda salts, etc., have been studied and reported in open literature and patents have issued for the recovery of Mo, Ni, V and Co from the spent catalysts. Several companies have also been established for large scale reclamation of metals and metal compounds from spent hydroprocessing catalysts. Alumina is the main component of hydroprocessing catalysts, accounting for more than 70 wt. % of the fresh catalysts.

The present invention provide-s a method of boehmite synthesis from spent hydroprocessing catalyst. The recovery of pure boehmite deserves attention because of its wide applications i.e., for reuse as catalyst support, for preparation of catalysts, sorbents, etc. The use of similar supports and catalysts and routes for metals recovery and alumina reported in the literature are described in the following patents.

U.S. Pat. No. 4,495,157 proposed oxygen pressure leaching of spent hydrodesulfurization catalyst for metal recovery using sodium carbonate in the leach slurry. The process and other proposals are operative but are still subject to improvement by way of reducing cost, improving metal recovery, improving filterability and reducing weight and volume of solids generated in the leaching steps and affording lower temperatures and pressures for leaching.

US Pat. Publication No. 2008/0025891, describes a process for recovering alumina values from a first liquor stream containing aluminate ions and hydroxyl ions in solution by forming an aluminium bearing layered double hydroxide. This process further relates to the use of aluminium-bearing layered double hydroxides (LDHs) to improve recovery of alumina values from bauxite using a modified form of the Bayer process. However, the recovery of alumina as boehmite from spent catalyst materials is not reported in this patent.

U.S. Pat. No. 4,657,745, reports a process for the recovery of aluminum, molybdenum and at least one other metal selected from the group consisting of nickel and cobalt from a spent catalyst. The spent catalyst (CoMo/$Al_2O_3$ was treated with $H_2SO_4$ in the presence of $H_2S$ under pressure (7.5-15 atm) in an autoclave at 100-200° C. The presence of $H_2S$ during leaching with $H_2SO_4$ results in the precipitation of Mo and Co as sulfides while the $Al_2O_3$ is converted to soluble $(Al_2SO_4)_3$. The metal sulfides were separated from the $Al_2(SO_4)_3$ solution and subjected to oxidation under pressure in an autoclave to convert $MoS_2$ to solid molybdic acid and the CoS to $CoSO_4$. The molybdic acid was separated by filtration from the $CoSO_4$ solution. The cobalt was recovered by ion exchange.

U.S. Pat. No. 4,142,871 discloses a process for utilizing spent catalysts in a process which combines the formation of alumina abrasives with the recovery of nickel or cobalt materials from the catalysts. The Zeiringer process melts the catalyst material containing the heavy metal, cools the material and mechanically separates the alumina-containing melt component from the metal alloy residue.

U.S. Pat. No. 4,029,495 also disclose a process for separating heavy metal materials such as nickel and cobalt from spent catalyst support materials. In the process, the spent catalyst material is heated to a sintering temperature to cause aggregation of the metal component. The mixture then may be either crushed and separated or further heated to from 1480° to 1580° C. to separate the molten heavy metal phase and a second melted phase comprising the carrier. The carrier may be separated by pouring off the top layer for use in formation of ceramic fibers and pouring the bottom layer into a mold to form ingots.

U.S. Pat. No. 5,702,500, deals with the treatment of materials containing alumina, silica, nickel, cobalt, molybdenum and vanadium. More specifically, the Patent discloses a treatment of spent catalysts and the recovery of valuable metals such as molybdenum, vanadium, nickel, cobalt and fused alumina by a combination of hydrometallurgical and pyrometallurgical processes.

U.S. Pat. No. 4,087,510, discloses mixing one part of finely ground spent catalysts with 0.5 to 0.9 parts of sodium carbonate and roasting the mixture at 650°-850° C. for about 1 to 2 hours. The roasted material is then dissolved in water to recover most of the molybdenum and vanadium in solution, along with 1-2% of the alumina contained in the catalyst. This process, however, does not recover aluminum, nickel or cobalt in commercially acceptable forms.

US Pat. Publication No. 2006/0258531 discloses a process for manufacturing a hydrorefining catalyst that exhibits high activity in a specific reaction by using a large pore diameter (50 to 2000 nm) catalyst that has been used in hydrorefining. The metal recovery mainly vanadium and nickel metals are from these spent hydrodemetallization catalyst that were carried out on regenerated catalyst and thus, established a method for metal recovered from the used regenerated catalyst. In this process metals components are recovered more efficiently, and the spent catalyst can be reused to manufacture as a regenerated catalyst that exhibits high reaction activity.

U.S. Pat. No. 4,349,381 discloses a process for smelting spent catalysts using two furnaces. Slag, produced from melting spent catalysts in the first furnace, is transported to a second furnace for adjustment of composition and quantity. This process however, does not address the recovery of molybdenum and vanadium as separate saleable products.

U.S. Pat. No. 3,567,433, discloses a process where ammonium carbonate solution used to extract metals by leaching of metals from hydrotreating spent catalysts and recovered more than 90% of Mo and V, and 60-70% of Ni by using leaching time and temperature, 1 h and 150° C., respectively U.S. Pat. No. 4,514,368, deals with an invention that relates to leaching of nickel, cobalt, molybdenum, tungsten, and vanadium from spent hydroprocessing catalysts, where inventor was able to extract at least 85% of Mo, 75-85% of V, 75-80 Ni and 45% of Co from decoked spent catalysts by leaching with an aqueous solution of ammonia containing an ammonium salt such as ammonium carbonate or ammonium sulfate. The pH of the ammonia solution was in the range 9.5-11 and extraction temperature was in range 85-95° C. Decoking temperature and leaching time were found to have a significant effect on the extracting of Ni and Co. Nickel extraction suffered as the roasting temperature during the decoking process was increased above 600° C. Inventor also found leaching time had a strong influence on Co recovery.

Most of the aforesaid patents are used to recover metals (Ni, V. Co, and Mo) while none of them clearly indicated alumina recovery as boehmite from spent hydroprocessing catalyst, which make the present invention different than those of the prior art patents. The present invention is an investigation of a spent catalyst where alumina support recovery is obtained at high purity and the nature of recovered solid has better textural properties, which is attributed to the method of alumina recovery. The present invention also provides a procedure in order to obtain boehmite from spent hydroprocessing catalysts and its textural property modification.

The present invention aims to overcome the problems and disadvantages of the prior art by providing a simple, and efficient procedure for complete extraction and recovery of valuable components of the spent hydroprocessing catalysts including alumina that could be reused in catalyst preparation. Surprisingly, little effort has been made in the prior art in seeking to recover the alumina support, which accounts for about sixty percent of the weight of spent catalysts, in the form of boehmite [AlO(OH)] with desirable textural properties for reuse as support material in the preparation of new catalysts as well as in many other applications.

BRIEF SUMMARY OF THE INVENTION

In essence, the present invention relates to a method for recovering boehmite and/or γ-alumnia from spent catalyst. The method comprises the steps of:
  providing a mass of alumina-supported spent catalysts containing from 1-10 wgt. % molybdenum, 1-6 wt. % nickel, 1-20 wt. % vanadium and 1-30 wt. % carbonatious deposits containing carbon, sulfur and oil residue; and removing oil residues from the spent Catalysts.

After removal of the oil residue the spent catalyst is dried and subsequently ground to produce a particle size of less than 500 microns. The process also includes the steps of removing carbonatious deposits by decoking under a temperature of 370-500° C. to produce a decoked spent catalyst residue. The residue is roasted with soda ash at a temperature within the range of 650° C. to 850° C. and the extracted vanadium and molybdenum contaminants are removed to obtain NiO/$Al_2O_3$ residue.

The aforementioned step is followed by digestion of the NiO/$Al_2O_3$ residue in NaOH and separating the Ni Oxide as a solid residue and aluminia as Sodium aluminate which is precipitated by $CO_2$ as a partially crystallized boehmite. Following this step a hydrothermal treatment of the partially crystallized pseudo-boehmite to obtain well crystallized boehmite with improved textural properties.

In a preferred embodiment of the invention the method for recovering boehmite and/or γ-alumina from alumina-supported spent catalysts consist of the following steps:
  a.) Providing a mass of spent catalysts containing from 1-10 wt. % molybdenum, 1-6 wt. % nickel, 1-20 wt. % vanidum and 1-30 wt. % carbonatious deposits carbon, sulfur and oil residue. In step b the oil residue has been removed from the spent catalysts by washing with natphtha and drying the spent catalysts after removal of the oil residue. In step c the dried spent catalysts is ground to produce a particle size of less than 500 microns and carbonation deposits are removed by decoking under a temperature range of 370-500° C. in step d to produce a decoked spent catalyst residue. The residue is then roasted with soda ash at a temperature of 750° C. Following the roasting step the vanidum and molybdenum are extracted by adding hot water and subsequently digestion of the NiO/$Al_2O_3$ residue in NaOH. In addition, the process includes filtering the digested NiO/$Al_2O_3$ to separate Ni Oxide as a solid residue and alumina as Sodium aluminate in the filtrate. A pseudoboehmite is then precipitated by adding $CO_2$ and subjecting to a hydrothermal treatment of the pseudo-boehmite to obtain well crystallized boehmite. Finally, the process includes a filtering drying and subsequently calcining the filtered and dried well crystallized boehmite at 500° C. for four hours to produce γ-alumina with a surfaced area greater than 240 $m^2$/g and pour volume greater than 0.75 ml/g and a mean pour diameter in the range of 100-110 Å.

The invention will now be described in connection with the accompanying drawings wherein like reference numerals have been used to define like parts.

DESCRIPTION OF THE PREFERRED EMBODIMENTS OF THE INVENTION

Figure 1:
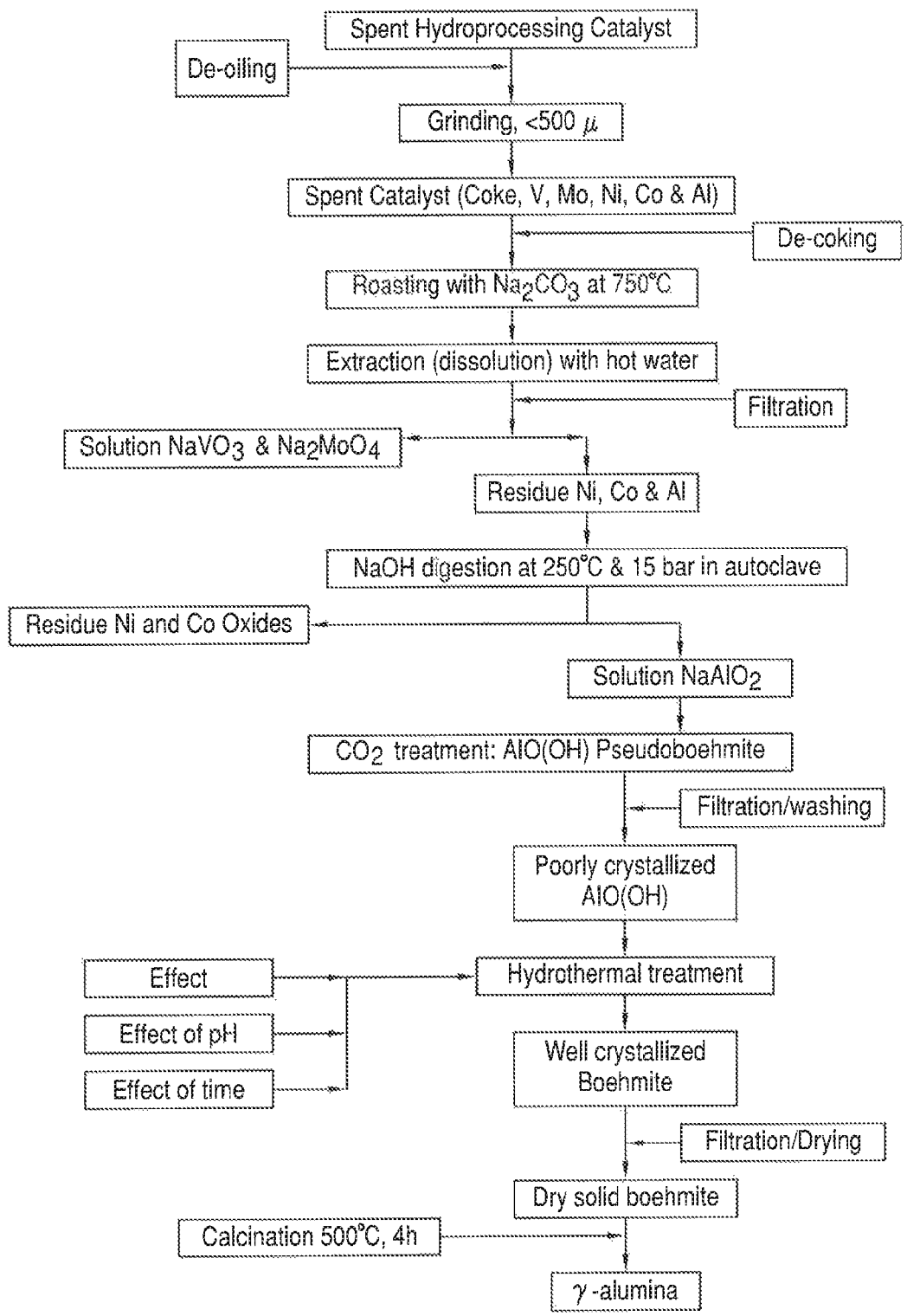
FIG. 1 is a flow diagram for alumina recovery as boehmite and γ-$Al_2O_3$ from spent hydroprocessing catalysts.

FIG. 1 is the schematic diagram of the steps used for alumina recovery from spent hydroprocessing catalysts. The final products (boehmite and γ-$Al_2O_3$ of this invention were obtained in various steps after the physical and chemical and hydrothermal treatments. This method is preferred due to a more complete recovery of all components and formation of high purity boehmite and γ-Al$_2$O$_3$ solid with improved properties that could be re-used as catalyst or catalyst supports in many industrially important processes, particularly, as a support in hydroprocessing catalysts. When unloaded from the reactor, the spent catalyst usually contains physically adsorbed impurities mostly residual hydrocarbons. These contaminants are removed by de-oiling, by washing with naphtha. The dried catalyst extrudates, are crushed and ground to fine powder in a grinding machine (ball-mill) and then sieved using a sieve shaker to fine particle of spent catalyst (<500 μm) (step II). The catalyst at this stage contains coke (Step III) and deposited metals (Ni and V, Fe etc.). The carbon species (coke) is removed by de-coking under controlled temperatures (450-550° C.). Decoking is preferably carried out by heating in air or in a gas containing 2-10% O$_2$ in N under programmed temperature conditions in the temperature range 370 to 550° C. After de-coking, spent catalyst powder (DCSC-1) is mixed with sodium carbonate and roasted at 750° C. for 1 hour (step IV). The roasted mixture is treated in hot water with stirring and reflux for 1 hour. The vanadium species and molybdenum species are dissolved while nickel, cobalt and aluminum remain un-dissolved as residue (solid) after hot water leaching (step V). The solution is filtered and washed so that dissolved species (mainly V and Mo) can be separated as liquid solution while un-dissolved material remains as a solid (step VI). The residue is mixed with NaOH solution and the mixture is stirred in a high pressure autoclave at relatively high temperatures (ranging from 180 to 250° C.) and pressures (ranging from 10 to 15 bars) for 3 h. Sodium aluminate thus formed by alkali digestion is separated from the un-reacted NiO or CoO as an insoluble residue by filtration (step VII). The filtrate, sodium aluminate solution, is then neutralized by CO$_2$ bubbling for two hours and converted to AlO(OH) (step VIII). The AlO(OH) white precipitate is separated by filtration and the residue was washed with distilled water several times and then filtered (step IX).

The aluminum oxide hydroxide [Al(O)OH] obtained in step IX from the spent catalyst is poorly crystallized boehmite or pseudo boehmite. It is subjected to hydrothermal treatment in a high pressure autoclave (step X) in order to convert it to well crystallized boehmite and to modify its textural properties with variation in hydrothermal conditions such as temperature and time. The hydrothermally treated product is filtered and washed and then dried at 110° C. for 12 h (step XI). The dried boehmite is finally calcined at 500° C. for 4 h, to convert boehmite into γ-alumina (step XII). The γ-Al$_2$O$_3$ recovered from the spent catalyst had desirable textural properties (surface area and porosity values) and could be used in the preparation of catalysts and catalyst supports.

In order to facilitate a more detailed understanding of this invention, the chemical reactions involved in various steps of the process are presented below.

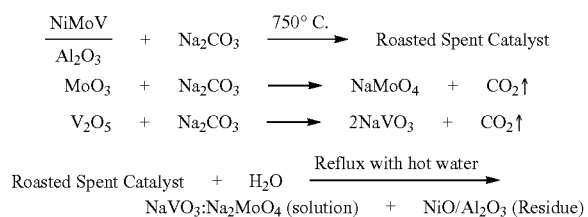

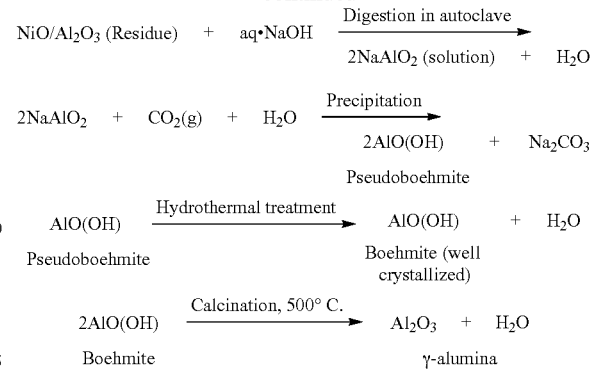

Thus, it has been discovered in this investigation that high quality boehmite that is suitable for the preparations of γ-Al$_2$O$_3$ with high surface area and large pore volume and mean pore diameter in the desirable range can be recovered from spent hydroprocessing catalysts after extracting the metals.

EXAMPLES

The following examples are provided to illustrate properties of the boehmite and gamma alumina recovered in the present invention from spent hydroprocessing catalyst under different experimental conditions. These examples should not be construed as limitations of the invention.

Example 1

A sample of the spent hydroprocessing catalyst was extracted with naphtha and toluene and then dried at 100° C. in an oven. The oil free catalyst was crushed and ground in a grinding machine (Christison Particle Technologies Ltd. Model KM 100) and then sieved using a sieve shaker (Endecotts, Model OCT Digital 4587-01) to obtain particle size of less than 500 μm. It was then decoked by heating in the presence of air in a muffle furnace. The temperature of the furnace was increased stepwise to 370, 450, 500 and 550° C. to burn the coke deposit on the catalyst completely. The decoked catalyst (labeled as DCSC-1) that contained 5.8 wt % Mo, 9.8 wt % V, 4.6 wt % Ni and 31.0 wt % Al was used in the metal extraction and alumina recovery experiments.

Figure 2:
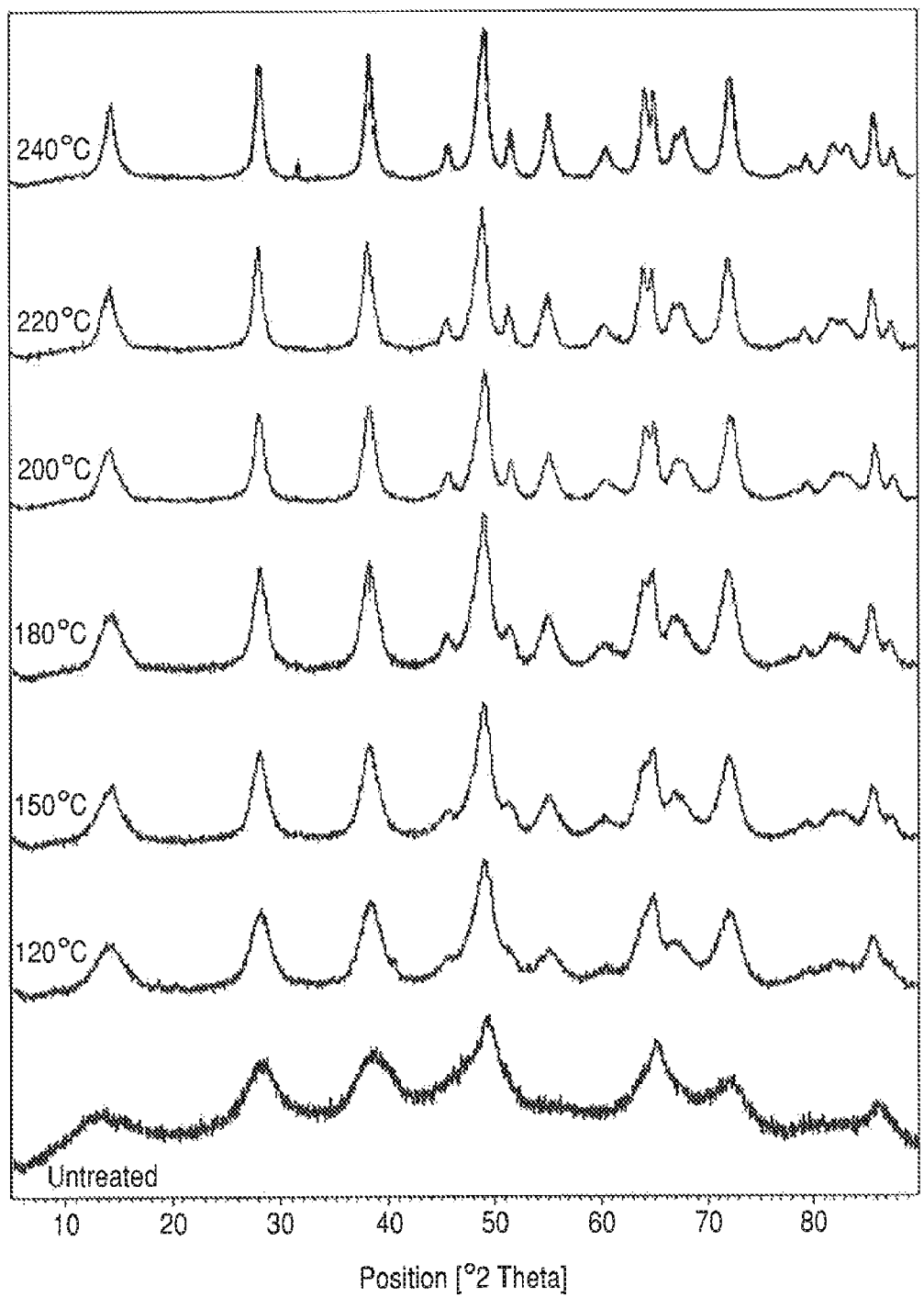
FIG. 2 is a X-Ray diffraction patterns for recovered boehmite illustrating the effect of hydrothermal reaction temperatures.
Figure 3:
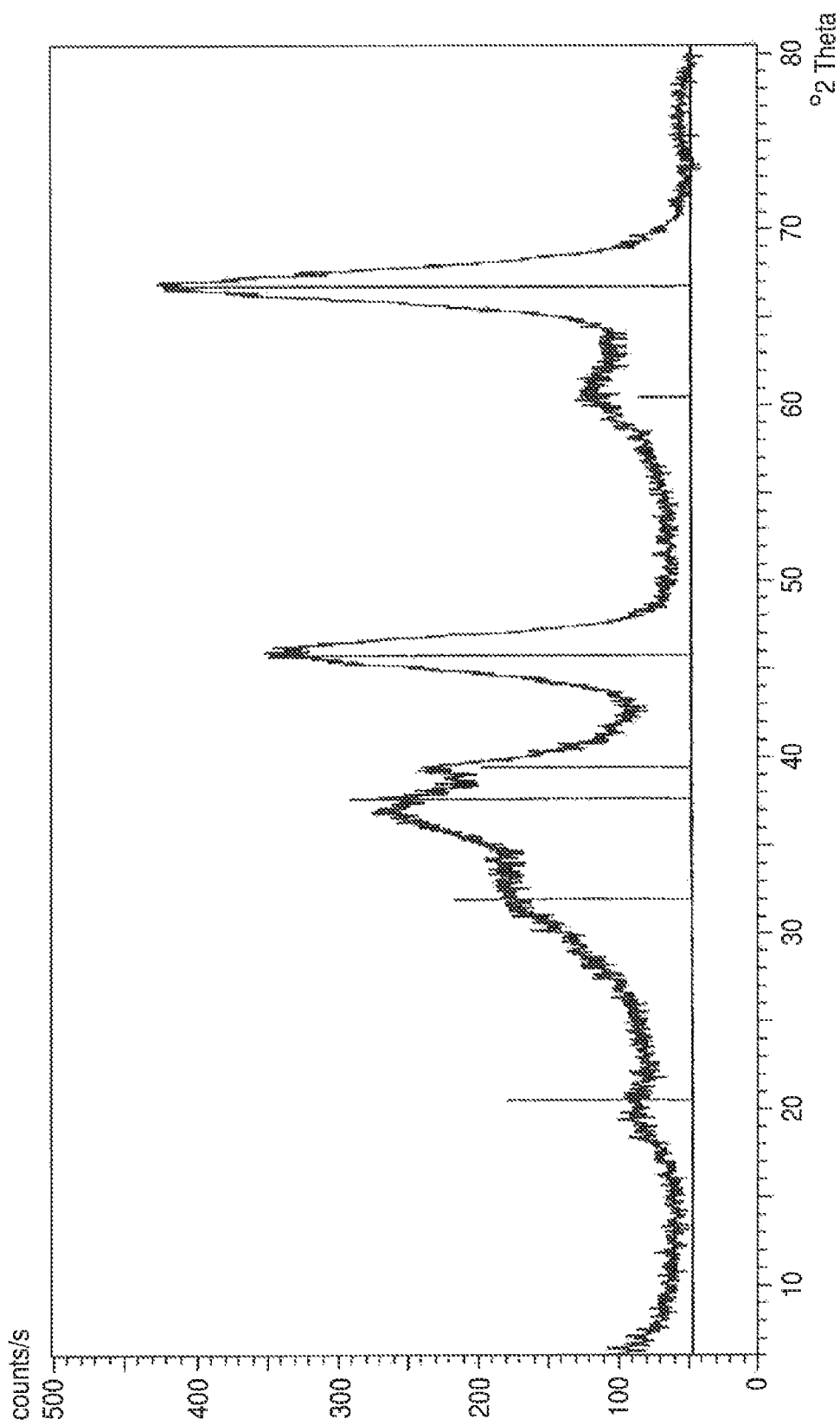
FIG. 3 is a X-Ray diffraction pattern of γ-alumina derived from the recovered boehmite.
Figure 4A:
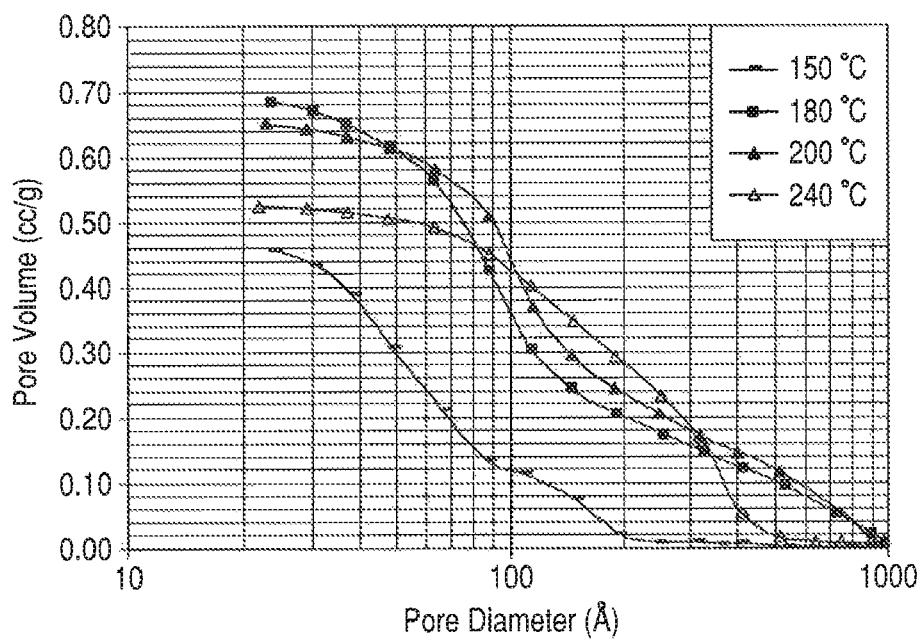
FIG. 4a shows pore size distribution of the boehmite illustrating the effect of hydrothermal reaction temperature.
Figure 4B:
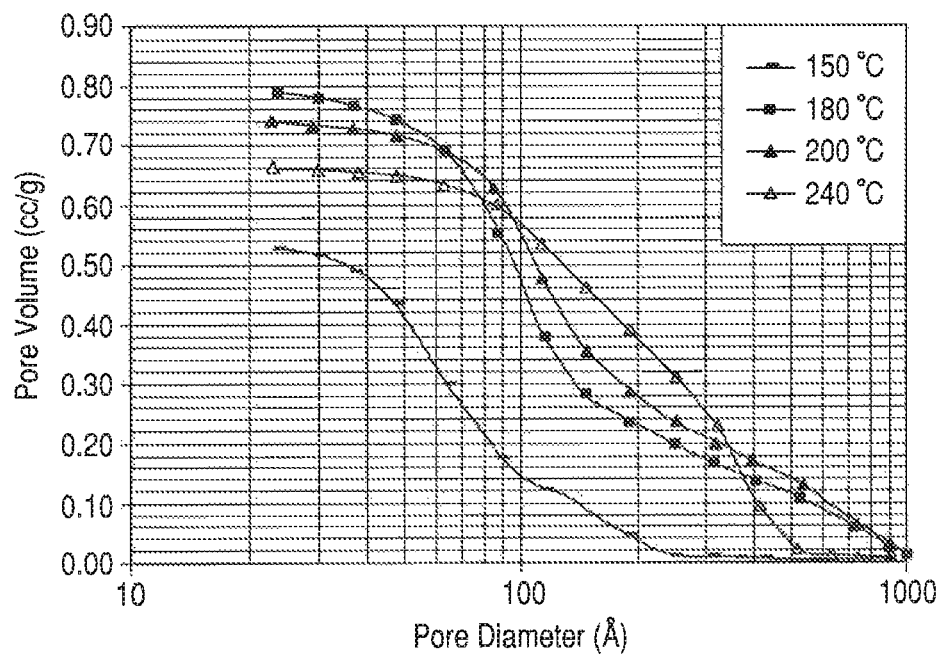
FIG. 4b shows pore size distribution of γ-alumina recovered illustrating the effect of hydrothermal reaction temperatures.

In a typical experiment 25 g of the decoked spent catalyst (DCSC-1) was thoroughly mixed with 7.5 g of soda ash and the mixture was roasted at 700° C. in a muffle furnace for 1 h to convert the oxides of Mo and V to sodium molybdate and sodium vanadate which were subsequently dissolved in hot water and removed by filtration. The residue containing NiO and Al$_2$O$_3$ was digested with caustic soda in an autoclave at 250° C. for 3 hrs to dissolve the Al as sodium aluminate leaving NiO as residue. The sodium aluminate solution @pH=13) was separated from the NiO residue by filtration and then treated with CO$_2$. The white precipitate formed was found to be poorly crystallized boehmite or pseudoboebmite [Al—O)OH)] by XRD analysis. It was filtered and dried. The poorly crystallized AlO(OH) obtained in the above step (referred as boehmite B1 hereafter) was converted to well crystallized boehmite by hydrothermal treatment in a high pressure autoclave manufactured by Parr Instrumental Company (model No. 5500), In a typical experiment 30 g of dried poorly crystallized boehmite sample (B1) was mixed with water and heated in the autoclave for 20 h and pH 9.4 at different temperatures with continuous stirring. During the hydrothermal treatment sample B1 was converted to well crystallized boehmite as shown in FIG. 2. The boehmite formed in the process was filtered, washed, dried at 110° C. and then characterized. The effect of hydrothermal treatment temperature on the textural properties (surface area, pore volume and average pore diameter) of boehmite is presented in Table 1. The boehmite samples prepared in these experiments were calcined at 500° C. for 4 h. The boehmite was transformed to γ-$Al_2O_3$ under these conditions. XRD pattern of the product formed by calcination of the boehmite at 500° C. is presented in FIG. 3 which shows all peaks of γ-$Al_2O_3$ and confirms the conversion of boehmite to γ-$Al_2O_3$. The effect of hydrothermal treatment reaction temperature on the pore size distribution of boehmite and γ-$Al_2O_3$ are illustrated in FIGS. 4a and 4b.

The textural properties of the γ-alumina samples derived from various boehmite samples (prepared by hydrothermal treatment at different temperatures in the range 120-240° C.) by calcinations at 500° C. for 4 h are included in Table 1. It is seen that changes in boehmite properties have a strong influence on the properties of γ-$Al_2O_3$. γ-$Al_2O_3$ with high surface area (269 m²/g) and large pore volume (0.78 ml/g) with desirable mean pore diameter (around 100 Å) could be prepared from the boehmite recovered from spent catalyst and hydrothermally treated at 180° C. for 20 h.

Table 1. Effect of Hydrothermal Temperature on Alumina Textural Properties (Hydrothermal Treatment Time 20 h)

TABLE 1

Effect of hydrothermal temperature on alumina textural properties (hydrothermal treatment time 20 h)

| Temp., ° C. | Un-calcined (boehmite) | | | Calcined 500° C.(γ-$Al_2O_3$) | | |
|---|---|---|---|---|---|---|
| | SSA, m²/g | TPV, ml/g | APD, Å | SSA, m²/g | TPV, ml/g | APD, Å |
| 100 | 332.9 | 0.49 | 48.3 | 288.6 | 0.55 | 60.8 |
| 120 | 226.4 | 0.41 | 58.3 | 276.2 | 0.59 | 72.8 |
| 150 | 262.9 | 0.46 | 65.4 | 268.7 | 0.53 | 75.5 |
| 180 | 244.0 | 0.68 | 96.6 | 269.2 | 0.78 | 101.3 |
| 200 | 184.4 | 0.65 | 117.3 | 195.9 | 0.74 | 126.2 |
| 220 | 159.0 | 0.51 | 108.0 | 201.2 | 0.64 | 109.3 |
| 240 | 117.0 | 0.52 | 173.2 | 149.7 | 0.66 | 170.6 |

APD (average pore diameter), Å; TPV (total pore volume), ml/g; specific surface area m²/g; Temp., temperature Example 2

Effect of Hydrothermal Treatment Duration on Boehmite and γ-$Al_2O_3$ Textural Properties This example demonstrates the effect of time of hydrothermal treatment on the properties of boehmite and γ-Al2O3. 30 g of dried boehmite sample B 1 prepared in accordance with procedure described in example 1, was mixed with 150 ml of water and heated in autoclave at 200° C. and of a pH 9.4 for different durations (4, 8, 12, 18, 20, 30 and 40 h). The hydrothermally treated samples were filtered washed, dried and characterized. The boehmite samples prepared in these experiments by hydrothermal treatment for different duration were converted to γ-Al by calcination at 500° C. for 4 h. The textural properties of boehmite and γ-$Al_2O_3$ prepared in these experiments are presented in Table 2.

Table 2. Effect Hydrothermal Treatment Time on Alumina Textural Properties (Hydrothermal Treatment Temperature: 200° C.)

TABLE 2

Effect hydrothermal treatment time on alumina textural properties (hydrothermal treatment temperture 200° C.)

| Time, h | Un-calcined (boehmite) | | | Calcined 500° C.(γ-$Al_2O_3$) | | |
|---|---|---|---|---|---|---|
| | SSA, m²/g | TPV, ml/g | APD, Å | SSA, m²/g | TPV, ml/g | APD, Å |
| 4 | 219.9 | 0.44 | 74.6 | 224.8 | 0.52 | 85.4 |
| 8 | 194.1 | 0.44 | 81.1 | 204.6 | 0.53 | 90.5 |
| 12 | 159.5 | 0.47 | 86.8 | 175.9 | 0.55 | 94.9 |
| 18 | 206.8 | 0.63 | 109.8 | 229.7 | 0.73 | 111.4 |
| 20 | 184.4 | 0.65 | 117.3 | 195.9 | 0.74 | 126.2 |
| 30 | 105.4 | 0.51 | 101.3 | 144.9 | 0.69 | 147.4 |
| 40 | 109.0 | 0.39 | 109.8 | 157.0 | 0.53 | 129.9 |

APD (average pore diameter), Å; TPV (total pore volume), ml/g; specific surface area, ml/g; Temp., temperature
APD (average pore diameter), Å; TPV (total pore volume), ml/g; specific surface area, m²/g; Temp., temperature.

Example 3

This example demonstrates the effect of PH of the water used for hydrothermal treatment on the textural properties of boehmite and γ-$Al_2O_3$. 30 g of dried boehmite sample B1 prepared in accordance with the procedure described in example 1, was mixed with 150 ml of water at different pH values (5, 7 and 11) and hydrothermally treated in an autoclave at 200° C. for 20 h. After hydrothermal treatment, the boehmite samples were filtered, dried at 110° C. and characterized for their textural properties. They were then converted to γ-$Al_2O_3$ by calcination at 500° C. for 4 h. The results presented in Table 3 show that the surface area and porosity values of the recovered γ-$Al_2O_3$ are substantially low when the pH of the hydrothermal treatment medium is in the neutral region. The use of acidic or basic solutions during hydrothermal treatment improves significantly the surface area and pore volume values of boehmite and 'γ-alumina samples.

TABLE 3

Effect hydrothermal treatment medium on alumina textural properties

| Temp., ° C. and Time, h | pH | Un-calcined (boehmite) | | | Calcined 500° C.(γ-$Al_2O_3$) | | |
|---|---|---|---|---|---|---|---|
| | | SSA, m²/g | TPV, ml/g | APD, Å | SSA, m²/g | TPV, ml/g | APD, Å |
| 200° C. and 20 h | 5 | 204.9 | 0.61 | 104.5 | 234.9 | 0.70 | 104.0 |
| | 7 | 192.8 | 0.42 | 84.5 | 206.7 | 0.51 | 94.6 |
| | 11 | 186.1 | 0.58 | 107.8 | 222.6 | 0.72 | 108.6 |

APD (average pore diameter), Å; TPV (total pore volume), ml/g; specific surface area, ml/g; Temp., temperature While the invention has been disclosed in connection with its preferred embodiments it should be recognized that changes and modifications may be made therein without departing from the scope of the claims.

What is claimed is:

1. A method for recovering boehmite and/or γ-alumnia from alumina-supported spent catalyst containing from 1-10 wt. % molybdenum, 1-6 wt. % nickel, 1-20 wt. % vanadium, and 1-30 wt. % carbonaceous deposits containing carbon, sulfur and oil residue, said method comprising the steps of:
   b.) removing oil residue from said spent catalysts;
   c.) drying the spent catalysts after removal of said oil residue;
   d.) grinding the dried spent catalysts after removal of the oil residue to produce a particle size of less than 500 microns;

e.) removing carbonaceous deposits by decoking said dried spent catalysts from step d at a temperature of 370-500° C. to produce a residue;

f.) roasting the residue from step e.) with soda ash in the range of 650° C. to 850° C.;

g.) removing extracted vanadium and molybdenum contaminants leaving a $NiO/Al_2O_3$ residue;

h.) digestion of the $NiO/Al_2O_3$ residue in NaOH;

i.) separating nickel oxide as a solid residue wherein sodium aluminate is precipitated by $CO_2$ as a partially crystallized boehmite; and j.) hydrothermal treatment of the partially crystallized boehmite to obtain well crystallized boehmite.

2. A method for recovering boehmite and/or γ-alumnia from alumina-supported spent catalyst containing from 1-10 wt. % molybdenum, 1-6 wt. % nickel, 1-20 wt. % vanadium and 1-30 wt. % carbonaceous deposits consisting of carbon, sulfur and oil residue according to claim 1 wherein alumina supported spent catalyst is washed or de-oiled to remove residual hydrocarbon oils prior to the recovery of vanadium and molybdenum.

3. A method for recovering boehmite and/or γ-alumnia from alumina-supported spent catalyst containing from 1-10 wt. % molybdenum, 1-6 wt. % nickel, 1-20 wt. % vanadium and 1-30 wt. % carbonaceous deposits consisting of carbon, sulfur and oil residue according to claim 1 wherein the removing of oil residue is done by washing with naphtha.

4. A method for recovering boehmite and/or γ-alumnia from alumina-supported spent catalyst containing from 1-10 wt. % molybdenum, 1-6 wt. % nickel, 1-20 wt. % vanadium and 1-30 wt. % carbonaceous deposits consisting of carbon, sulfur and oil residue according to claim 3 in which coke is removed by calcinations in the presence of air or in a gas containing 2-10% oxygen in nitrogen under temperatures in the range of about 370° C. to about 550° C.

5. A method for recovering boehmite and/or γ-alumnia from alumina-supported spent catalyst containing from 1-10 wt. % molybdenum, 1-6 wt. % nickel, 1-20 wt. % vanadium and 1-30 wt. % carbonaceous deposits consisting of carbon, sulfur and oil residue according to claim 1 in which the roasting of the decoked catalysts is done in a furnace at about 750° C. with sodium carbonate and later treated in hot water with stirring and reflux for one hour wherein the vanadium and molybdenum are dissolved while nickel, cobalt and aluminum remain undissolved.

6. A method for recovering boehmite and/or γ-alumnia from alumina-supported spent catalyst containing from 1-10 wt. % molybdenum, 1-6 wt. % nickel, 1-20 wt. % vanadium and 1-30 wt. % carbonaceous deposits consisting of carbon, sulfur and oil residue according to claim 1 wherein the residue from step g.) after extracting molybdenum and vanadium is further digested in NaOH at between about 100-250° C. and 1-30 bar pressure and a pH in the range of 10-13.

7. A method for recovering boehmite and/or γ-alumnia from alumina-supported spent catalyst containing from 1-10 wt. % molybdenum, 1-6 wt. % nickel, 1-20 wt. % vanadium and 1-30 wt. % carbonaceous deposits consisting of carbon, sulfur and oil residue according to claim 1 where the sodium aluminate of step i.) contains alumina in solution which is precipitated by carbon dioxide bubbling as poorly crystallized boehmite or pseudoboehmite.

8. A method for recovering boehmite and/or γ-alumnia from alumina-supported spent catalyst containing from 1-10 wt. % molybdenum, 1-6 wt. % nickel, 1-20 wt. % vanadium and 1-30 wt. % carbonaceous deposits consisting of carbon, sulfur and oil residue according to claim 1 wherein the partially crystallized boehmite is heated in the range of about 100° C. to 250° C., the pH is in the range of 5 to 12 and the digestion period is from 10-30 hours.

9. A method for recovering boehmite and/or γ-alumnia from alumina-supported spent catalyst containing from 1-10 wt. % molybdenum, 1-6 wt. % nickel, 1-20 wt. % vanadium and 1-30 wt. % carbonaceous deposits consisting of carbon, sulfur and oil residue according to claim 8 where the partially crystallized boehmite is heated in the range of 180° to 200° C., the pH is in the range of 9-10 and the digestive period is from 18-20 hours.

10. A method for recovering boehmite and/or γ-alumnia from alumina-supported spent catalyst containing from 1-10 wt. % molybdenum, 1-6 wt. % nickel, 1-20 wt. % vanadium and 1-30 wt. % carbonaceous deposits consisting of carbon, sulfur and oil residue according to claim 1 wherein the γ-alumina has a high surface area of greater than 240 $m^2$/g, large pore volume of greater than 0.75 m/g and mean pore diameter in the range of 100-110 Å.

11. A method for recovering boehmite and/or γ-alumnia from alumina-supported spent catalyst containing from 1-10 wt. % molybdenum, 1-6 wt. % nickel, 1-20 wt. % vanadium and 1-30 wt. % carbonaceous deposits consisting of carbon, sulfur and oil residue according to claim 1 in which the well crystallized boehmite is filtered, dried and subsequently calcined at about 500° C. for about 4 hours to thereby produce the γ-alumina.

12. A method for recovering boehmite and/or γ-alumina from alumina-supported spent catalysts, said method consisting of the following steps:

a.) providing a mass of alumina-supported spent catalysts containing from 1-10 wt. % molybdenum, 1-6 wt. % nickel, 1-20 wt. % vanadium and 1-30 wt. % carbonaceous deposits containing carbon, sulfur and oil residue;

b.) removing oil residue from said spent catalysts by washing with naphtha;

c.) drying the spent catalysts after removal of the oil residue;

d.) grinding the dried spent catalysts after removal of the oil residue to produce a particle size of less than 500 microns;

e.) removing carbonaceous deposits by decoking under a temperature range of 370-500° C. to produce a residue;

f.) roasting the residue from step (e.) with soda ash at a temperature of 750° C.;

g.) filtering the roasted residue for removal of extracted vanadium and molybdenum in which hot water has been added leaving a $NiO/Al_2O_3$ residue;

h.) digestion of the $NiO/Al_2O_3$ residue in NaOH;

i.) filtering the digested $NiO/Al_2O_3$ to obtain nickel oxide as a solid residue and alumina as sodium aluminate in the filtrate;

j.) precipitating pseudoboehmite by adding $CO_2$;

k.) hydrothermal treatment of the pseudoboehmite to obtain well crystallized boehmite from step j; and l.) filtering, drying and subsequently calcining the filtered and dried well crystallized boehmite from step k at 500° C. for 4 hours to produce γ-alumina with surface area greater than 240 $m^2$/g, a pore volume of greater than 0.75 ml/g and a mean pore diameter in the range of 100-110 Å.

* * * * *